May 8, 1934.   W. J. COULTAS   1,957,445
CUTTING APPARATUS
Filed July 1, 1932
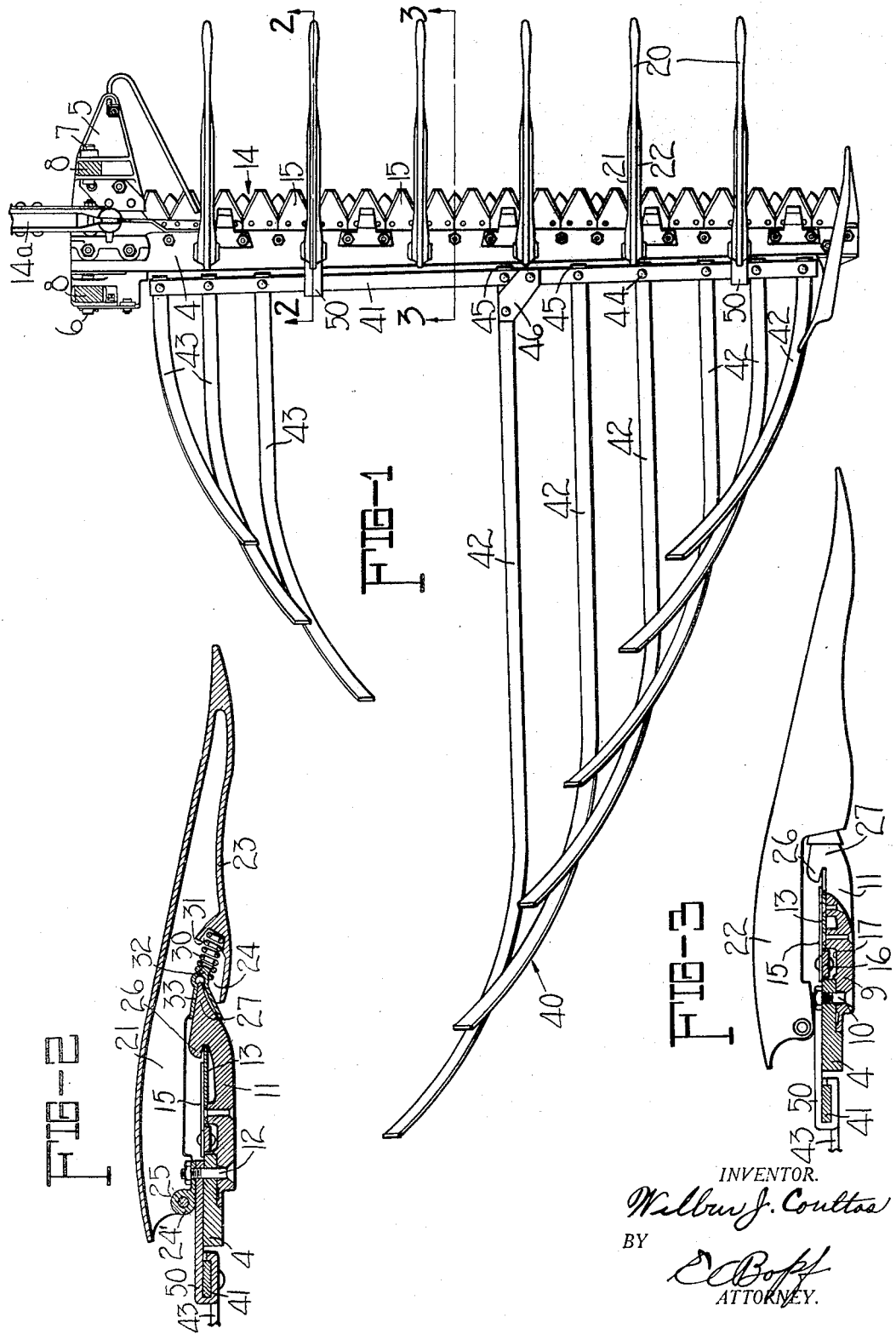
INVENTOR.
Wilbur J. Coultas
BY
ATTORNEY.

Patented May 8, 1934

1,957,445

UNITED STATES PATENT OFFICE 1,957,445

CUTTING APPARATUS

Wilbur J. Coultas, Moline, Ill., assignor to Deere & Company, Moline, Ill., a corporation of Illinois Application July 1, 1932, Serial No. 620,388

5 Claims. (Cl. 56—307)

This invention relates to mowers and more particularly to those adapted especially for use in cutting vine crops such as peas.

The cutting of vine crops, especially peas, is an exceedingly difficult operation to do satisfactorily not only because the vines are usually interwoven and sometimes lying flat upon the ground, but also because of the difficult conditions under which the crop must occasionally be harvested. When peas are ready to be harvested, they must be cut regardless of weather conditions and for this reason it may be necessary to operate in a field which is very soft and wet. In fact, the best crop is obtained when it is cut while it is raining as it is detrimental to the peas to permit them to become dry after once being severed from the stalk.

In order to make it possible to operate in all kinds of field conditions some attempts have been made to especially equip cutter bars of mowers, but so far as I am aware none of these attempts have resulted in a cutter bar which can be operated under all conditions without more or less trouble being encountered. It is usually necessary for a man to walk behind the mower and occasionally rake away the vines which have not cleared the cutter bar and, when operating in muddy conditions, to occasionally clean the cutter bar of mud and refuse which has collected in and around the guard fingers to give the sickle the free movement it must have for satisfactory operation.

The object of my invention is the provision of a cutting mechanism for a mower especially adapted for harvesting peas and so designed that it will operate satisfactorily under all working conditions in which it may be called upon to operate, and in which the tendency for cut vines and other material to collect about the cutter bar has been reduced to a minimum.

I accomplish this object primarily by providing a cutter bar equipped with stub guard fingers, instead of the conventional lipped guard fingers having rearwardly extending lips overlying the sickle, with the ends thereof disposed slightly rearwardly of the tip of the knife sections of the sickle. With the tip of the knife sections of the sickle extending beyond the ends of the stub fingers the tendency for vines, mud and refuse to gather on the points of the guard fingers is eliminated. The sickle due to its reciprocating action not only cuts the pea vines but the tips of the knife sections also cut through all refuse and mud that would otherwise collect on the ends of the conventional guard fingers extending beyond the point of the knife sections. Since pea vines at the time they are harvested are usually lodged and interwoven and are sometimes lying flat on the ground, it is necessary to provide lifting guards for raising the vines from the ground to allow the cutter bar to pass underneath. I provide a number of specially designed lifting guards on the cutter bar, a particular feature of the design being that they are relatively narrow to provide the maximum space between adjacent guards. The sides of the lifting guards comprise substantially parallel walls so that the space between adjacent lifting guards is substantially as wide at the rear as it is at the tip of the lifting guards by reason of which the tendency for material to collect or bridge between the guards is reduced to a minimum. The lifting guards extend over the cutter bar so as to hold the vines above the cutter bar and guide them over it. The sides of the lifting guards extend down to within close proximity to the sickle to substantially close the space between the top of the lifting guards and the sickle. This eliminates the tendency for vines or refuse to collect between the top of the lifting guard and the sickle.

In order to eliminate the tendency for refuse to collect between the rear end of the tip portion of the lifting guards and the forward edge of the cutter bar, I have provided specially designed guard fingers disposed below the lifting guards which are provided with points which project into a pocket provided in the rear end of the tip portion of the lifting guard. This provides an overlapping connection between the guard finger and the lifting guard, and completely closes the space between the rear end of the tip portion of the lifting guard and the forward edge of the cutter bar, thereby eliminating the possibility of vines, mud or other matter collecting at this point.

Another object of the invention is the provision of the improved central delivery windrower for use in connection with my improved cutter bar. The main feature of this windrower resides in its rigid construction by which it is capable of withstanding the heavy loads encountered when harvesting crops such as peas. I have also provided novel fittings by which the windrower is fastened to the cutter bar.

The manner in which various objects of my invention are accomplished are more specifically described in the following specification of a preferred embodiment of the invention disclosed in the accompanying drawing wherein:

Figure 1 is a plan view of my improved cutter bar with the novel windrower attached thereto;

Figure 2 is a sectional view along the line 2—2 of Figure 1 showing one of the lifting guards and the special guard finger in section; and, Figure 3 is a sectional view along the line 3—3 of Figure 1 showing one of the stub fingers in section and a special guard finger and a lifting guard in elevation.

The cutter bar comprises a laterally extending finger bar 4 fixed at its inner end to a shoe 5 which in turn is pivotally connected by means of pivots 6 and 7 to the downwardly extending arms 8 of the shoe arch of the mower. The invention is not concerned with the shoe and shoe arch construction which may be a conventional design, and therefore need not be described in detail.

To the under side of the finger bar 4 a plurality of stub fingers 9 are bolted by means of bolts 10. Between each pair of stub fingers 9 a specially shaped guard finger 11 is provided, these being bolted to the under side of the finger bar 4 by means of bolts 12. Stub fingers 9 and guard fingers 11 are provided with ledger plates 13. A sickle 14 operated by means of a pitman 14a is provided. Sickle 14 comprises knife sections 15 carried by the knife back 16 which rests in the recess 17 formed in stub fingers 9 and guard fingers 11. The rear edge of the knife back bears against the forward edge of the finger bar 4. Knife sections 15 of the cutter bar bear on the top face of the ledger plates 13. Stub fingers 9, as well as the ledger plates 13 carried thereby, are of such length that the tip of the knife sections 15 project slightly beyond the end thereof.

A number of lifting guards 20 are provided on the cutter bar. They are substantially of U-shaped cross-section having substantially parallel sides 21 and 22. The bottom of the tip portion of the lifting guards is closed in by the wall 23 to form a pocket 24 at the rear end thereof. Each lifting guard is pivotally mounted on the cutter bar by means of a pivot 25 and a clip 24' disposed between the sides 21 and 22. Clips 24' are fixed to the finger bar 4 by means of the same bolts 12 which fix guard fingers 11 to the finger bar. This positions lifting guards 20 directly over guard fingers 11.

Guard fingers 11 are shaped similar to the conventional guard fingers except that they are not provided with a rearwardly extending lip such as is usually found on such guard fingers, but instead are formed with a short rearwardly extending boss 26 of just sufficient length to form a pocket for receiving the tip of the ledger plates. These lipless guard fingers 11 are also provided with forwardly extending points 27 which project into the pocket 24 of the lifting guards 20, substantially closing the space between the rear end of the tip portion of the lifting guard and the forward edge of the cutter bar.

To yieldingly hold the lifting guard down in operating position, a compressible spring 30 is provided. This spring rests in a recess 31 formed in the pocket 24 and embraces a protruding lug 32 formed on the tip of a cap 33 provided over the tip 27 of the guard fingers 11. If desired, the end of the tip 27 may be specially shaped to receive the spring 30 in which case the need of the cap 33 would be obviated. Also, other means may be provided for yieldingly holding the lifting guards 20 in operating position.

In the above described arrangement a series of passageways are provided between adjacent lifting guards, each passageway being bounded by substantially perpendicular closed walls, the width of the passageway being substantially the same from front to rear, with a sickle disposed across the passageway, the tip of the knife sections thereof being entirely exposed. There being no pockets or projecting corners in the passageway, all tendency for vines and other material to collect upon the cutter bar is eliminated, and as such material is guided between the lifting guards to the sickle, the sickle not only severs the vines of the crop from the stalks, but the exposed tips of the knife sections thereof also cut through any foreign material they encounter and make an opening through the same through which the cutter bar may pass. As a result, this cutter bar may be operated without interruption and without clogging under the most severe field conditions.

I have also provided a central delivery windrower 40 disposed back of the cutter bar. This windrower comprises a transversely disposed bar 41 to which are connected rearwardly extending arms 42 and 43. Arms 42 are fixedly connected to bar 41 in spaced relation near the outer end thereof while bars 43 are fixedly connected to bar 41 in spaced relation near the inner end thereof. The rear end of bars 43 are curved upwardly and outwardly to guide the crop cut by the inner end of the cutter bar towards the center while the rear ends of arms 42 are curved upwardly and inwardly to guide the crop cut by the outer end of the cutter bar towards the center. To provide a rigid connection of arms 42 and 43 with transverse bar 41 I find it desirable to not only rivet the arms to the bar by means of rivets 44 but to also bend the forward ends thereof upwardly against the front edge of the bar 41 and weld the same to the bar. To further reinforce the innermost arm 42 upon which the greatest load is imposed, I provide a diagonally disposed gusset plate 46 riveted to the arm and the bar.

The windrower is fixed to the cutter bar by means of a number of clips 50. These clips comprise flat straps extending rearwardly from the cutter bar, the rear end thereof being bent to embrace the bar 41. Clips 50 are fixed to the finger bar 4 by means of bolts 12, the clips being disposed underneath the brackets 24.

To facilitate shipping, I find it desirable to crate the windrowers and cutter bars separately, the cutter bars having the clips 50 fixed thereto with the bent rearward end thereof being open sufficiently so that when the windrower is to be assembled to the cutter bar it is merely necessary to hook the bar 41 in place and then close the bend at the rear end of the clips.

I claim:

1. A cutter bar comprising a finger bar, a plurality of stub guard fingers fixed thereto and having forwardly extending tips, a sickle supported by said stub guard fingers, the knife sections thereof extending beyond the tips of the stub guard fingers, a plurality of lifting guards pivotally carried by the finger bar and disposed at spaced intervals along the finger bar, said lifting guards being relatively narrow and having substantially parallel sides to provide passageways between adjacent lifting guards of maximum width and of substantially the same width from front to rear, said lifting guards also having pockets in the rear end of the forward portions thereof, guard fingers fixed to the finger bar below the lifting guards, and having forwardly extending tip portions projecting into said pockets thereby providing a closed overlapping connection between the lifting guards and the guard fingers below the lifting guards whereby the passage of material rearwardly along the side of the lifting fingers and guard fingers to the rear of the cutter bar is facilitated.

2. A cutter bar comprising a finger bar, a plurality of stub guard fingers fixed thereto, a sickle supported upon said stub guard fingers, a plurality of lifting guards carried by the finger bar and disposed at spaced intervals along the finger bar, said lifting guards being relatively narrow and having substantially closed sides, and having pockets in the rear end of the forward portions thereof, a guard finger fixed to the finger bar below each lifting guard, and having forwardly extending tip portions projecting into said pockets, whereby a passageway is provided between adjacent lifting guards having substantially closed side walls across which extends the sickle entirely exposed.

3. A cutter bar comprising a finger bar, a plurality of stub guard fingers fixed thereto, a sickle supported upon said stub guard fingers, a plurality of lifting guards carried by the finger bar and disposed at spaced intervals along the finger bar, said lifting guards having substantially closed sides, a guard finger fixed to the finger bar below each lifting guard and having a forwardly extending tip portion projecting between the two sides of the lifting guard to provide an overlapping connection therewith, whereby a passageway is provided between adjacent lifting guards of substantially closed side walls across which extends the sickle the top face of which is entirely exposed.

4. In a cutting mechanism, the combination of a cutter bar comprising a finger bar, a plurality of stub guards fixed thereto and having forwardly extending tips, and a plurality of guard fingers fixed to the finger bar at spaced intervals between said stub guards, a plurality of lifting guards carried by the cutter bar and disposed one above each of said guard fingers, said lifting guards being relatively narrow and having substantially parallel sides to provide passageways between adjacent lifting guards of maximum width and of substantially the same width from front to rear, said lifting guards also having pockets in the end of the forward portion thereof, said guard fingers having forwardly extending tip portions projecting into said pockets thereby providing a closed overlapping connection between the lifting guards and the guard fingers below the lifting guards whereby the passage of material rearwardly along the side of the lifting fingers and guard fingers to the rear of the cutter bar is facilitated, and a sickle supported by said stub guards and said finger guards, the knife sections thereof extending forwardly at least to the front ends of the tips of the stub guards.

5. In a cutting mechanism, the combination of a cutter bar comprising a finger bar, a plurality of stub guards fixed thereto, and a plurality of guard fingers fixed to the finger bar at spaced intervals between said stub guards, a plurality of lifting guards carried by the cutter bar and disposed one above each of said guard fingers, said lifting guards having substantially closed sides, said guard fingers having forwardly extending tip portions projecting between the two sides of the lifting guards disposed thereabove to provide an overlapping connection therewith, whereby a passageway is provided between adjacent lifting guards of substantially closed side walls, and a sickle supported upon said stub guards and said guard fingers.

WILBUR J. COULTAS.